United States Patent [19]

Danik

[11] 4,032,759

[45] June 28, 1977

[54] SHIPBOARD REFERENCE FOR AN AIRCRAFT NAVIGATION SYSTEM

[75] Inventor: Boris Danik, North Caldwell, N.J.

[73] Assignee: The Singer Company, Little Falls, N.J.

[22] Filed: Oct. 24, 1975

[21] Appl. No.: 625,429

[52] U.S. Cl. .................. 235/150.25; 73/178 R; 114/261 AC; 244/3.2

[51] Int. Cl.² ..................................... G06F 15/50

[58] Field of Search ............... 235/150.25; 73/505, 73/511, 514, 517 R, 518, 178 R; 244/177, 179, 3.20, 3.21; 307/121; 318/648; 323/71, 72; 346/7; 114/43.5 R, 43.5 AC; 343/112 R, 112 C, 114

[56] References Cited

UNITED STATES PATENTS

| | | | |
|---|---|---|---|
| 2,914,763 | 11/1959 | Greenwood, Jr. et al. | 235/150.25 |
| 3,345,017 | 10/1967 | Olah | 235/150.25 |
| 3,576,124 | 4/1971 | O'Connor | 73/178 R |
| 3,702,477 | 11/1972 | Brown | 235/150.25 |
| 3,790,766 | 2/1974 | Brown | 235/150.25 |
| 3,872,284 | 3/1975 | Seligman et al. | 235/150.25 |
| 3,903,398 | 9/1975 | Matthews | 235/150.25 |

OTHER PUBLICATIONS

Buell, Heinz; Doppler, Inertial, and Doppler-Inertial Techniques; Navigation: Journal of the Institute of Navigation; vol. 11, No. 3, Autumn, 1964, pp. 250–259.

Primary Examiner—Malcolm A. Morrison
Assistant Examiner—Errol A. Krass
Attorney, Agent, or Firm—Thomas W. Kennedy

[57] ABSTRACT

A low cost shipboard reference system for carrying out the rapid alignment of aircraft inertial platforms in which an aircraft quality inertial reference is installed on shipboard and is operated in conjunction with a shipboard Kalman filter providing updating information thereto with the update connection from the Kalman to the shipboard inertial system normally kept opened and always kept opened during aircraft platform alignment to result in reference outputs for use in the aircraft system which are free of correlated noise but of sufficient accuracy for rapid alignment with a small azimuth error.

10 Claims, 9 Drawing Figures

FUNCTIONAL ALIGNMENT DIAGRAM

ALIGNMENT MECHANIZATION DIAGRAM

KALMAN FILTER BLOCK DIAGRAM

```
001      SUBROUTINE FMAT1A (F,P,H,COV21A,COLM1A,R21A,NS,NS,P1,T)
002      REAL *8 F(NS,1),P(NS,1),H(NO,1)P1(NS,1),T(NS,1)
003      REAL LAMDOT
004      LOGICAL LOS
005      LOGICAL SKY
006      COMMON /ETHRD/RN,RE,REQT,EPPS,REPPSZ,DSNSQR
007      COMMON /GRAVWE/GRAV,OMEGA
008      COMMON/LORAN/LAT(30),XLON(50),TMB1AS(30),TNOISE,NSTAT,NFIXES,DTX
        1,DTY,N(20),NY(20),NM(20)JFIX,LORAN,RSTAT(4),SKY(20),FF(3),GG(3),
         21FIX,TMB1AG(30),SNOISE,LOS
009      COMMON /NEFRME/ VND(3),HALT
010      COMMON/PROFLE/PLTLAT,PLTLON,SINLAT,COSLAT
011      COMMON /TIME/ DELT,INL,NP1,NP2,NP3,TT,PRNTPL
012      DIMENSION COV2IA(NS),CQLM1IA(NS),R2IA(NO)
013      VNORTH=NV(1)
014      VEAST=VN(2)
       C INITIALIZATION
015      IF (INL.EQ.1) GO TO 1
016      VNP=VNORTH
017      VEP=VEAST
018      NTEST=0
019      NMAX=NP3/NP2
020      FDET=DELT*FLOAT(NP2)
021      NSO=NS*NO
022      CALL DCZERO (NSU,H)
023      NS2=NS*NS
024      RETURN
025    1 CONTINUE
026      NTEST=NTEST+1
       C INITIALIZE PI LOGIC
027      IF (INTEST.NE.1) GO TO 4
028      CALL DCZERO (NS2,F)
029      CALL DCZERO (NS2,PI)
030      DO 2 I=1,NS
031      F(1,1)=1.
032    2 PI(I,I)=1
033      F(1,4)=GRAV*FDET
034      F(2,3)=-F(1,4)
035      F(3,3)=FDET
036      F(4,9)=FDET
037      F(5,10)=FDET
038    4 CONTINUE
       C INERTIAL PARAMETERS
039      TANLAT=SINLAT/CUSLAT
040      VOP=VN(3)
041      PHIDOT=VEAST/((RE+HALT)*COSLAT)
042      LAMDOT=VNORTH/(RN+HALT)
043      WNORTH=(OMEGA+PHIDOT)*COSLAT
044      WEAST=-LAMDOT
045      WUP=(OMEGA+PHIDOT)*SINLAT
046      TNLTRE=TANLAT/(RE+HALT)
047      RATE=2.*OMEGA+PHIDOT
048      ALDT=(VEAST-VEP)-RATE*SINLAT*VNORTH*FDET
049      ANDT=(VNORTH-VNP)+RATE*SINLAT*VEAST*FDET
050      VNP=VNORTH
051      VEP=VEAST
052      F(1,1)=(VOP/(RN+HALT)
053      F(1,2)=-(VEAST*TNLTRE+RATE*SINLAT)*FDET
054      F(1,5)=-AEDT-(KXX+K21*VEAST/(RN+HALT))*VEAST*FDET
055      F(1,6)=-(VEAST*VEAST*TANLAT*TNLTRE+RAT=*VEAST*COSLAT)*FDET
056      F(2,1)=(RATE*SINLAT)*FDET
057      F(2,2)=1+(VNORTH*TNLTRE-VOP/(RE+HALT)-KYY)*FDET
058      F(2,5)=ANDT+(KYY+K21*VEAST/(RN+HALT))*VNORTH*FDET
059      F(2,6)=(VEAST*TNLTR=+(VNORTH*TANLAT-VOP)+RATE*(VNORTH*COSLAT+VOP*S
        s1I1NLAT)*FDET
060      F(3,2)=(+1.)/(RE+HALT))*FDET
061      F(3,4)=-WOP*FDET
```

FIG. 6A

```
062        F(3,5)=(WEAST)*FDET
063        F(3,6)=(-WOP+VEAST*TNLTRE)*FDET
064        F(4,1)=-((K1XX+1.)/(RN+HALT))*FDET
065        F(4,2)=-F(3,4)
066        F(4,5)=-(WNORTH+VEAST*K1XX/(RN+HALT))*FDET
067        F(5,2)=TNLTR+*FDET
068        F(5,3)=-WEAST*FDET
069        F(5,4)=WNORTH*FDET
070        F(5,5)=1.
071        F(5,6)=((VEAST*TNLTRE-WOP)*TANLAT+WNORTH/(COSLAT*COSLAT))*FDET
072        F(6,1)=(1./(RN+HALT))*FDET
073        F(7,2)=(1./((RE+HALT)*COSLAT))*FDET
074        F(7,6)=(VEAST*TNLTRE/COSLAT)*FDET
     C  PI OPERATOR LOGIC
075        CALL PRTMUL(F,PI,T,NS,7)
076        CALL DOMOVE (NS2,T,PI)
077        IF (NTESLTNMAX) RETURN
078        CALL DOMOVE (NS2,PI,F)
079        NTEST=0
     C  OBSERVATION MATRIX, TIME-VARYING TERMS
080        CALL DOZERO (NSO,H)
081        IF(LORAN.EQ.1) GO TO 7
082        H(1,1)=1.
083        H(2,2)=1.
084        H(1,5)=VEAST
085        H(1,11)=VEAST
086        H(1,12)=-VNORTH
087        H(2,5)=-VNORTH
088        H(2,11)=-VNORTH
089        H(2,12)=-VEAST
090        RETURN
091     7  CONTINUE
092        CALL XLRAN(0)
093        H(1,6)=FF(1) -FF(3)
094        H(1,7)=GG(1) -GG(3)
095        H(2,7)=GG(2) -GG(3)
096        H(2,6)=FF(2) -FF(3)
097        RETURN
098        END
```

FIG. 6B

```
001       SUBROUTINE RMSFIA (F,P,H,COV2IA,COLMIA, R2IA,9NS, NO)
002       REAL *8F(NS,L),P(NS,1),H(NG,L)
003       DOUBLE PRECISION G,D,Z,E,B,R,LL,NN,X,Y,S,C,Q,W,O, CEM, CSQRT
004       REAL KDB,MNSB, MESB,MUSB,LAT,LON
005       LOGICAL FLAG, GWARM,CYCLE,SKY, LOS
006       COMMON /ETHRD/ RN,RE,REQT, FPPS, REPPS2,DSNSQR
007       COMMON /GORIFT/CXGW,CYGW,CSGW,GWARM
008       COMMON /GRAVWE/ GRAV, OMEGA
009       COMMON/LORAN/ XLAT(30),XLON(30),TMBIAS(30),TNOISE,NSTAT,NFIXES,CTX
         1,DTY,NX(20)NY(20),NM(20),JFIX,LORAN,RSTAT(4),SKY(20)FF(3),GG(3),
         2IFIX,TMBIAG(30),SNOISE,LOS
010       COMMON /NEFRME/ VND(3),VN(3),HALT
011       COMMON /PLTVEL/ VXG(30),VYG(30),VZG(30),LAT(30),HI(30),LON(30)
012       COMMON /SCRACH/ G(12,12),D(12,12),E(12,2),B(2,2),
         1R(2,2),LL(2),NN(2),X(12,1),Y(2,1),S(12,2),C(2,1),Q(12,1),W(12,1),
         2U(2,12)
013       COMMON /TIME/ DELT,INL,NPI,NP2,NP3,TT,PRNTPL
014       COMMON /TURN/ GAM,GAMDOT,BETA,TRUEHD,TRUEEL,THDG,TREL
015       DIMENSION COV2IA(1),COLMIA(1),R2IA(1)
        C INITIALIZATION
016       IF (INL.EQ.1) GO TO 10
017       NS2=NS*NS
018       CALL DCZERO (NS2,P)
019       DO 1 I=1,NS
020       P(I,I)=COV2IA(I)
021     1 CONTINUE
022     2 CONTINUE
023       DO 3 I=1,NS
024       Z(1,1)=COLMIA(1)
025     3 CONTINUE
026       MS5=MS*NPM
027       CALL SZERO (MS5,XPREV)
028       GO TO 16
029    10 CONTINUE
030       CYCLE=.TRUE.
031       ICYCL=ISTAR+IPOSTN+LORAN
032       IF((MODE .EQ.7) .AND. (ICYCL .EQ.0)) CYCLE =.FALSE.
033       IF(LORAN.EQ.1)GO TO 25
034       R(1,1)=R2IA(1)
035       R(2,2)=R2IA(2)
036    25 CONTINUE
037       IF( SKY(JFIX)) GO TO 35
038       R(1,1) =RSTAT(1)
039       R(2,2) = RSTAT(2)
040       GO TO 11
041    35 CONTINUE
042       R(1,1) =RSTAT(3)
043       R(2,2) =RSTAT(4)
044    11 CONTINUE
        C GENERATION OF GAIN MATRIX
045       CALL FPFT(P,F,D,NS,7)
046       CALL DMATAD (C,Z,G,NS,NS)
047       IF (CYCLE) GO TO 31
048       CALL DCMOVE (NS2,G,P)
049       GO TO 32
050    31 CONTINUE
051       CALL DTMAML (G,H,E,NS,NS,NC,NS,O,1)
052       CALL DMATML (H,E,B,NO,NS,NC)
053       CALL DMATAD (B,R,B,NC,NO)
054       CALL DMINV1 (B,NO,DEM,LL,NN,FLAG)
055       CALL DMATML (E,B,S,NS,NO,NC)
        C NEW GAIN MATRIX NOW STORED IN MATRIX S
        C GENERATION OF NEW COVARIANCE MATRIX FOLLOWS
056       CALL DMATML (H,G,U,NC,NS,NS)
057       CALL DMATML (S,U,D,NS,NO,NS)
058       CALL DMATSB (G,D,P,NS,NS)
        C NEW COVARIANCE MATRIX NOW STORED IN P
059       CALL DMATML (H,F,U,NO,NS,NS)
```

FIG. 7A

```
060   32 CONTINUE
       C UPDATE OF THE N STATE VECTORS FOLLOWS
061      N=1
       C STORE PREVIOUS VALUE OF STATE VECTOR FOR N-TH RUN IN X
062      DO 12 I=1,NS
063   12 X(I,1)=XPREV(I,N)
064      IF(LORAN.EQ.1)GO TO 26
065      Y(1,1)=DLVX(N)
066      Y(2,1)=DLVY(N)
067      GO TO 13
068   23 CONTINUE
069      CALL STELAR(N,DFLB,DELE)
070      Y(1,1) = DELB
071      Y(2,1) = DELE
072      GO TO 13
073   26 CONTINUE
074      CALL XLRAN(N)
075      Y(1,1)= DTX
076      Y(2,1)= DTY
077   13 CONTINUE
       C SOLVE FOR FILTERS ESTIMATE OF X
078      CALL DMATML (U,X,O,NO,NS,1)
079      CALL DMATSB (Y,O,O,NO,1)
080      CALL DMATML (S,O,Q,NS,NO,1)
081   33 CALL DMATML (F,X,W,NS,NS,1)
082      CALL DMATAD (W,Q,X,NS,1)
       C UPDATE PREVIOUS VALUE OF N-TH PLATFORM STATE VECTOR
083      DO 14 I=1,,NS
084   14 XPREV(I,N)=X(I,1)
085      IF(LORAN.EQ.0)GO TO 30
086      LORAN=C
087      IFIX = IFIX + 1
088   30 CONTINUE
       C STORAGE FOR OUTPUT
089   16 RETURN
090      END
```

FIG. 7B

SHIPBOARD REFERENCE FOR AN AIRCRAFT NAVIGATION SYSTEM

BACKGROUND OF THE INVENTION

This invention relates to navigation systems in general and more particularly to an improved method for carrying out the rapid-alignment of an aircraft inertial platform using a low-cost aircraft type shipboard reference system.

Carrier based aircraft, when taking off from the carrier must have their inertial platforms properly aligned in azimuth and vertically, to reflect the existing state vector as they are on the carrier. Typically, such has been carried out by using a shipboard inertial navigation system of extremely high accuracy. Such an inertial system is lightly damped by the EM log which supresses the Schuler oscillations caused by random component drift. Once aligned, such a system provides very accurate velocity and position outputs over a long period of time. Position fixes are used occasionally to update the system. Such a system provides alignment outputs (North and East velocity) to an aircraft which then uses this data for rapid alignment of its own inertial platform. To carry out such rapid alignment Kalman filtering is typically used in the aircraft. Such a system works quite well. However, the highly accurate ship's inertial navigation system used has a cost in the range of two million dollars. In view of this, the desirability of being able to carry out such an alignment using an aircraft type inertial platform which is of lower accuracy and cost become evident. However, if such a platform is used it must provide sufficient accuracy to properly align the aircraft platform.

Previous attempts at using aircraft type inertial platforms as shipboard references have not been particularly successful.

In such systems the velocity and azimuth accuracy diverges over a fairly short period of time if realignment is not carried out. Even with good initial alignment at dockside, the velocity accuracy during the first several hours will typically be in the order of 1 foot/second. The platform must be realigned at sea at regular time intervals using information from an EM log and/or electronic positioning equipment such as a Loran or Omega system. Initial alignment of such a platform at sea would require at least one hour and probably longer. As a result, the use of such a system requires either alternating between alignment and navigation modes or remaining permanently in a hybrid alignment navigation mode. The system may also be operated by remaining in an hybrid mode with regular imputs to a ship's Kalman filter being provided from the inertial platform, an EM log and a device such as an Omega or a Loran. In this way, the Kalman filter continually provides an accurate estimate of the desired state vector quantities. In point of fact, through such an implementation a velocity error on the order of one foot/second or better can be obtained. However, when an output of this nature is provided from ship's Kalman filter as an input to an aircraft platform system an accurate azimuth reference is not obtained unless an excessive alignment time exists. This is demonstrated by FIG. 1 which illustrates the error in recovered heading in the aircraft as a function of the correlation time of correlated noise where correlation time is the reciprical of the noise band width. As this figure illustrates, with a short alignment time of 300 seconds and only 0.25 ft/second of reference noise, a half degree error in heading or azimuth can result. Only by extending the alignment time to a much longer period such as a length of 1,000 seconds will the Kalman filtering result in the desired low error. Because of this effect of correlated noise on azimuth accuracy, this approach has been considered to be unworkable. There have been attempts to overcome these deficiencies mostly by modeling, in the aircraft's Kalman filter, the reference velocity correlated noise. Clearly such as increased complexity in the aircraft is not desirable.

Thus, it can be seen that there is a need for a method of employing a low cost aircraft inertial platform as a shipboard reference for aligning aircraft platforms. Aircraft inertial systems have a cost which is at least an order of magnitude less than the cost of a highly accurate shipboard inertial system, i.e., the difference between a hundred thousand dollars and two million dollars. In view of this, the development of such a system can result in considerable cost savings for the user.

SUMMARY OF THE INVENTION

The present invention provides such a system. The solution of the problem is based on the recognition that, during alignment with a Kalman filter, an aircraft's inertial platform system can tolerate relatively large errors in the reference velocity, on the order of 1 foot/second if such errors are in the form of Schuler oscillations rather than correlated noise. As long as a classic regressive fitting or a Kalman filter is used to align an inertial platform, its azimuth estimation accuracy is dynamically insensitive to Schuler oscillations in the reference velocity; and the velocity estimation error of the platform becomes dynamically equal to the reference velocity error. The scientific reason for this advantageous phenomenon is that a Kalman filter of the platform which is being aligned (in this case an aircraft's filter) cannot distinguish between the Schuler oscillations in its own platform velocity and the Schuler oscillations in the reference velocity, and, therefore, it computes and attributes the overall Schuler oscillations to its own platform, thereby causing the platform to inherit the reference velocity Schuler error. In this process the azimuth estimation accuracy is not destroyed because the aircraft's Kalman filter knows (from a mathematical inertial model programmed into it) that the Schuler oscillations are not caused by an azimuth error unless there is also present a constant North velocity error (which is detected by the filter using again the reference velocity). This is exactly what happens if there is an initial azimuth error, and it is easily computed by the filter, as long as there is no correlated noise. Based on this, the method of the present invention comprises providing the velocity reference directly from an aircraft type shipboard inertial subsystem. The shipboard inertial subsystem is operated in conjunction with a shipboard Kalman filter which provides it with updating information. However, the update connection from the Kalman filter to the shipboard inertial subsystem is normally kept opened and always kept opened during aircraft platform alignment. During this period, the inertial sub-system may drift in accuracy, but this drift will be primarily in the form of a Schuler oscillation which can be tolerated by the aircraft platform. Periodically, during times when aircraft platform alignment is not being carried out, the shipboard Kalman filter output is used to update the shipboard inertial sub-system. Because the Kalman filter output, which contains correlated noise which is the direct result of noise on the inputs from the EM log and Omega or Loran and in the manner in which the Kalman filtering itself is carried out, is not coupled to the shipboard inertial sub-system during aircraft platform alignment an essentially clean signal containing nothing more than Schuler oscillations results. As a consequence, the aircraft platform is rapidly aligned with a very small azimuth error.

BRIEF DESCRIPTION OF THE DRAWINGS

FIGS. 6a and 6b are a program listing used in implementing the Kalman filter of the present invention.

FIGS. 7a and 7b are subroutines for use in implementing the Kalman filter.

DETAILED DESCRIPTION OF THE PREFERRED EMBODIMENT

Figure 1:
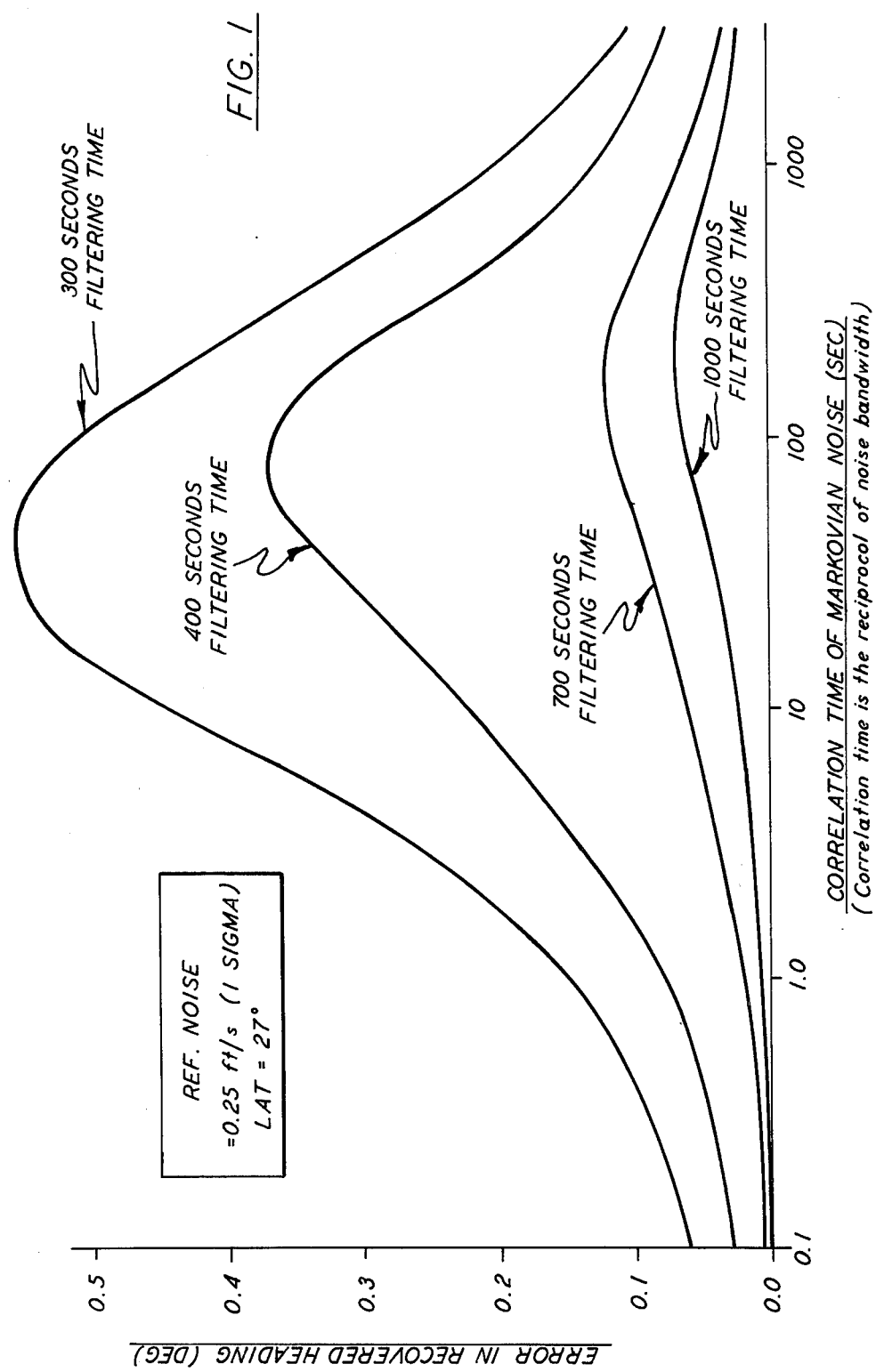
FIG. 1 is a curve illustrating the error is recovered heading in an aircraft as a function of correlated noise.
Figure 2:
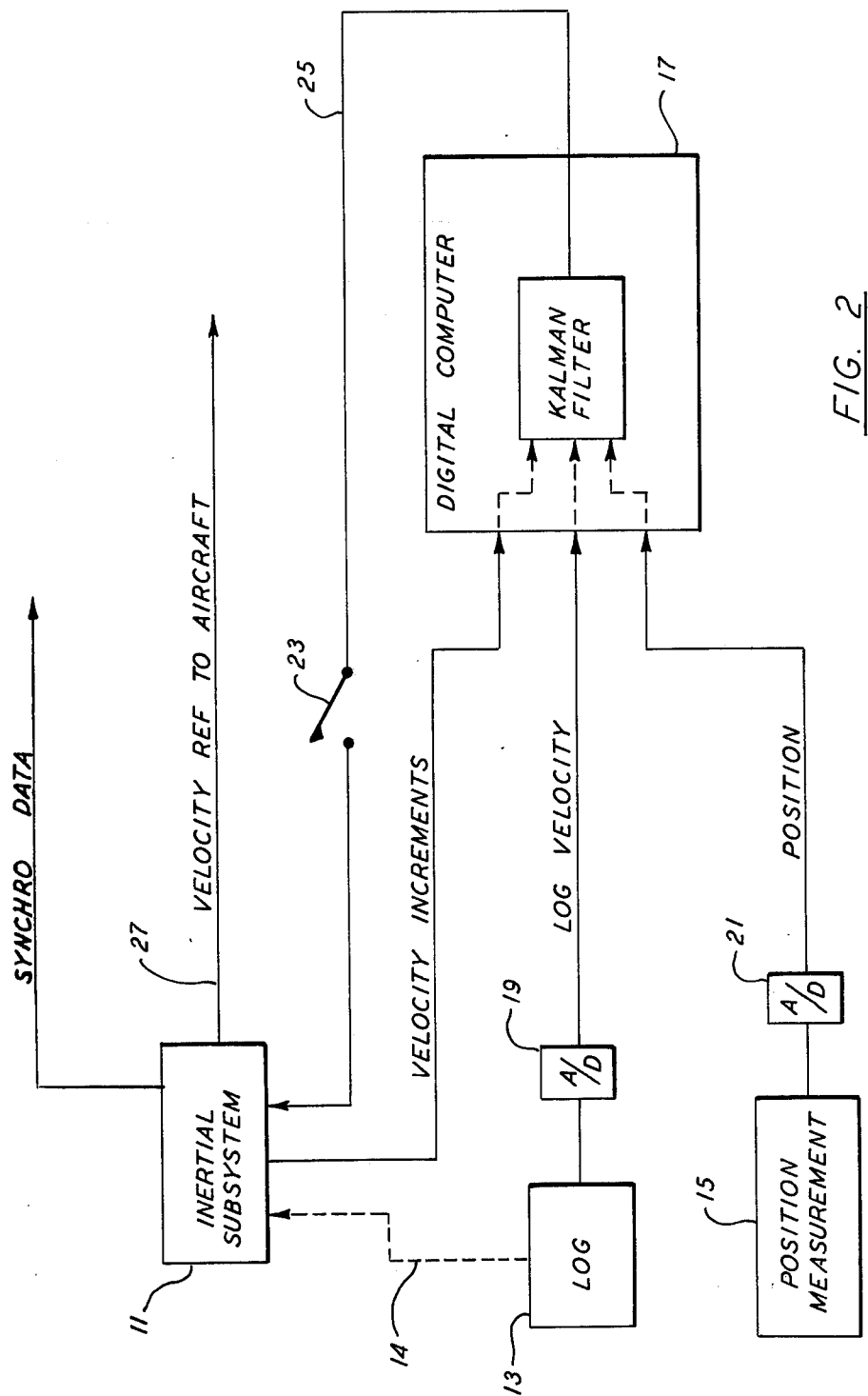
FIG. 2 is a block diagram illustrating a carrier reference system according to the present invention.
Figure 3:
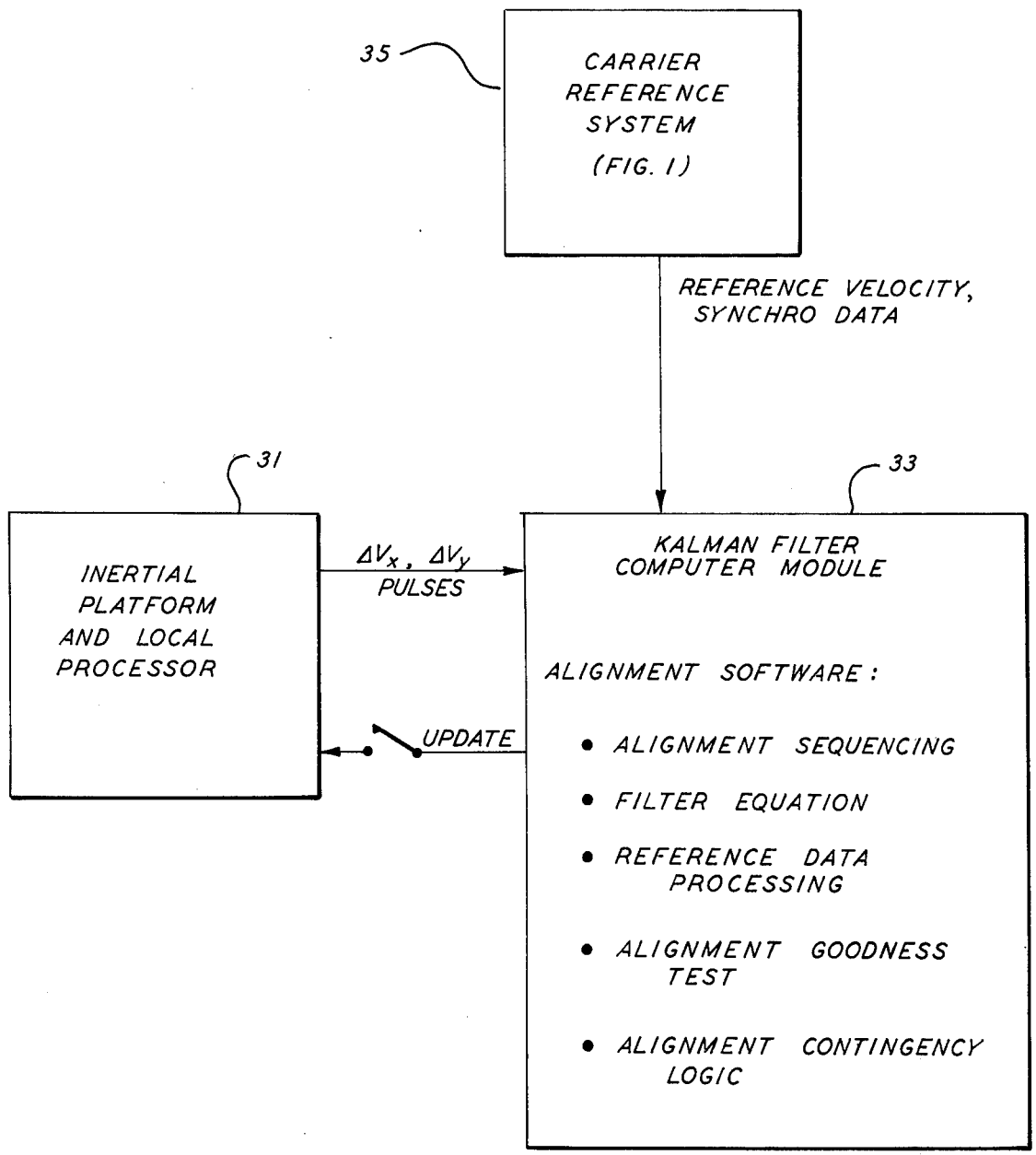
FIG. 3 is a block diagram illustrating the aircraft inertial sub-system.

FIG. 2 illustrates the carrier reference system according to the present invention in block diagram form. The system includes an inertial subsystem 11 of aircraft quality. Typical of inertial subsystems which may be used are the systems sold under the designations SKN-2600 or Gamma-1 by the Kearfott Division of the Singer Company. Also included is a log device 13 to determine velocity relative to the water. Preferably this will be an electromagnetic log or EM-log such as that manufactured by Control Instruments Company of Brooklyn, N.Y. Also included is a position measurement device which may be an Omega or Loran set. For example an Omega set designated ARN-99 manufactured by Northup or a Canadian Marconi CMA-719 or CMA-723 may be used. The final major piece of equipment is a digital computer 17 which may be a Singer Kearfott SKC-3000 computer. The inertial subsystem 11 includes its own digital computer and thus accepts and provides as outputs digital words or digital pulses. It will be recognized that, to avoid duplication, the digital computer 17 can be combined with the digital computer in the inertial subsystem if the necessary additional memory capability is provided therein. However, for purposes of describing the present invention the computer 17 will be considered as a separate element. The log 13 will typically be a device providing an analog output. Because of this an analog/digital converter 19 is provided between the log 13 and digital computer 17. Similarly an analog/digital converter 21 is provided between the position measurement device 15 and the digital computer 17. The digital computer 17 serves one basic purpose. It is used for implementing a Kalman filter. As is well known in the art, Kalman filters are used for developing best estimates of changing state vectors. To do this the Kalman filter uses update information along with previously computed values in a manner to be explained more fully below. In the present case the Kalman filter receives as updating information an output from the inertial subsystem in the form of a pulse train with incremental velocity pulses providing velocity data at high rate. Typically a system such as the SKN-2600 will provide outputs in which the scaling is 0.032 ft/sec/pulses. The other two inputs, called the observations, are the velocity relative to water obtained from the log 13 and analog to digital converter 19 and position updates from the position measurement device 15 such as an Omega or Loran. Depending on the device used this information may be in the form of time differences, phase differences or latitude and longitude. From this data the Kalman filter computes its best estimate which is then provided back to the inertial subsystem 11. The quantities updated in this manner are the North and East velocity, the vertically, azimuth, and latitude and longitude. Shown within the computer 17 in schematic form is a switch 23. In accordance with the present invention these updates are not fed back continuously but only infrequently. The very low update rate (once in 2 hours or less often) is an essential feature of the present invention. The outputs of the log 13 and the position measurements device 15 are generally noisy. Furthermore the Kalman filter being an incremental technique results in an output which can consist of a series of steps. If this noisy output which appears in the state vector estimate on the output line 25 is provided to the inertial subsytem 11 it will be transmitted through the inertial subsystem to the velocity reference output therefrom on line 27. Even if this noise in the output is of a relatively low level, i.e., in the order of a 1/ft/sec error, it is a correlated noise which, as indicated above, seriously affects the ability to quickly align the aircraft platform accurately. When the switch 23 is open, the inertial subsystem output on line 27 will drift between updates but the error will be a Schuler oscillation error which, it has been discovered, can easily be tolerated by the aircraft system without introducing significant azimuth error. In the aircraft will be another inertial subsystem such as an SKN-2600 inertial subsystem. The system in the aircraft is illustrated in block diagram form on FIG. 3. Basically it includes an inertial platform with its local processor 31 and a Kalman filter computer module 33. In practice, the platform processor and the Kalman module are contained in a single computer, such as an SKC-3000. As will be seen in detail below, the Kalman computer module obtains $V_x$ and $V_y$ pulses from the inertial platform unit 31. The various functions carried out in the computer module are listed on the drawing. The Kalman computer module obtains velocity and synchro attitude information from the carrier reference system 35 of FIG. 3. The synchro data are used to compute the relative velocity between aircraft and the reference system, due to lever arms. Alignment of the system is carried out using a Kalman filter in the computer module. It is accomplished through the explicit estimation of azimuth misalignment and tilt errors. The two lever arm states are used during carrier alignment to compensate for the effect of the relative motion between the carrier reference system and the aircraft system being aligned.

Figure 4:
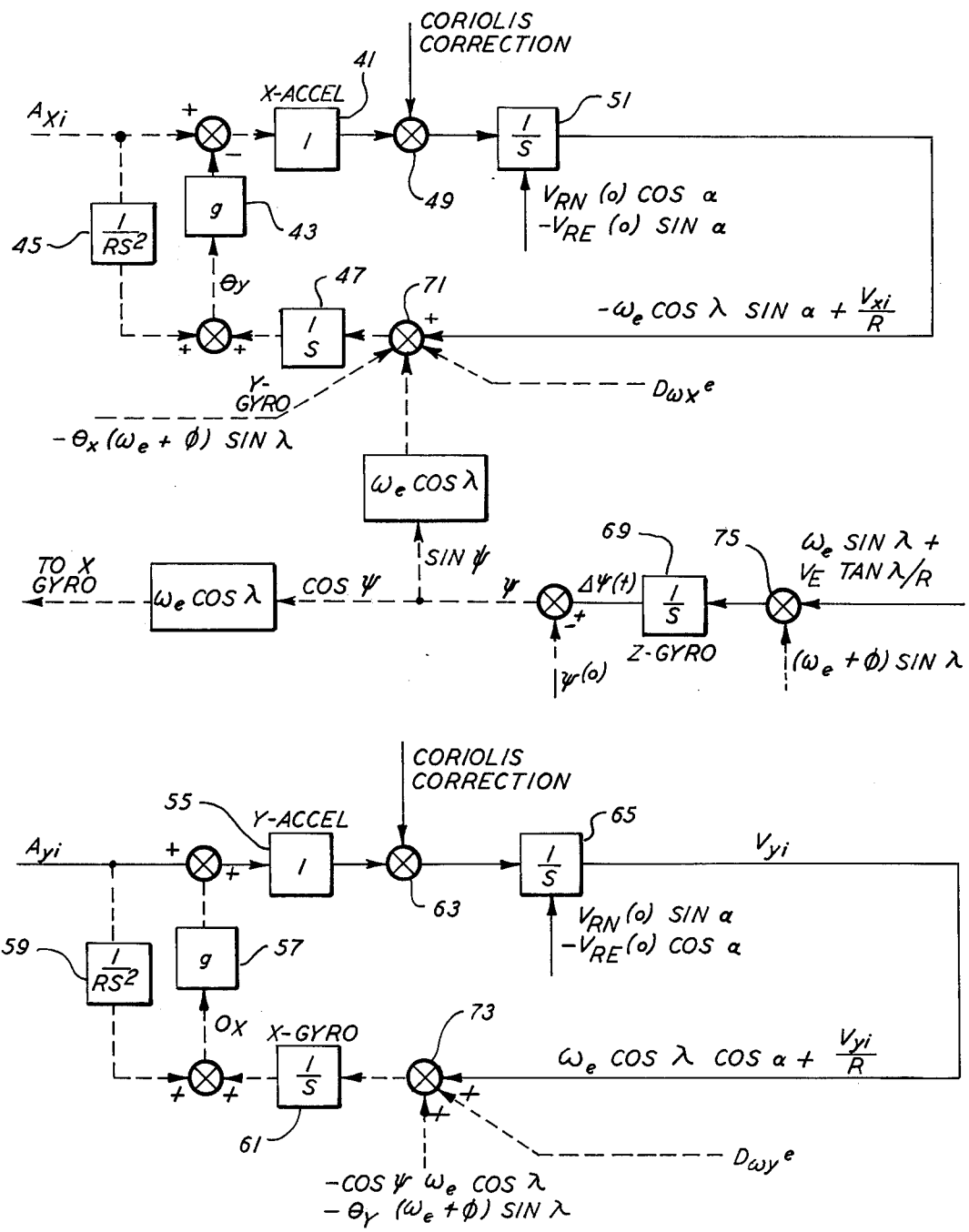
FIG. 4 is a schematic diagram illustrating the platform mechanization for alignment.

FIG. 4 illustrates the platform mechanization for alignment. Solid lines represent functions performed in the computer with dashed lines representing the kinematic gyro and accelerometer inputs. The platform is in a Schuler loop. The gyros are torgued as function of the velocities and latitude, and the apriori estimate of azimuth angle $\alpha$. The true azimuth offset is $\omega$ and the error between the two denoted as $\delta_u$. During coarse alignment α equals zero and during final alignment it is equal to the value of the azimuth misalignment estimated during coarse alignment. On FIG. 4, $V_{xi}$ and $V_{yi}$ represent the velocities computed by the inertial subsystem. Shown on FIG. 4 is a block entitled X-ACCEL. This is the X-accelerometer 41. Shown as inputs thereto are the various factors which effect the output of the X-accelerometer. These include the actual acceleration along the X axis $A_{xi}$ to which is added the effect of gravity indicated by a block 43. This is the effect which will occur if the platform is tilted. As inputs to the block 43 are the summation of inputs from block 45 and 47. Block 45 represents the rotation of local vertical corresponding to motion along the surface of the earth, R is the radius of the earth, and block 47 represents the Y-gyro torquing effect. The input into the block 43 is labelled $\theta_y$ and represent the tilt about the Y axis. Thus, the output of the X-accelerometer 41 will include tilt errors. To this output is added, in a summing junction 49, the Coriolis correction with the output therefrom then integrated as indicated by block 51. Shown as inputs to block 51 are $V_{RN}$ (0) cosα and $V_{RE}$ (0) sinα. These are the initial conditions of velocity resolved from the north and east reference system into the platform coordinates by using the angle α. This output velocity, designated $V_{xi}$, is then used to torque the platform.

In similar fashion the Y-accelerometer 55 will provide an output having error contributions obtained from the block 57 which has inputs from blocks 56 and 61 similar to blocks 45 and 47 above. In this case block 61 is the X-gyro and the input to the block 57 is an angle $\theta_x$ representing the tilt about the x axis. Once again the Y-acceloeometer output is summed in a summing juction 63 with the Coriolis correction and the result then integrated in a block 65 which has as an initial condition input the initial velocity along the Y direction of the inertial platform to develop an output $V_y$. These two outputs $V_y$ and $V_x$ are the outputs provided to the Kalman filter. Inputs to the inertial platform are torquing rates for the three gyros, i.e., the Y-gyro 47, the X-gyro 61 and the Z-gyro 69. The input to the Y-gyro 47 is, as indicated $W_e$ cosλ sinα + $V_{xi}$/R. The purpose of an inertial platform in this case is that the platform remains locally level and maintains a constant azimuth. For such to occur the gyros must be torqued at a rate corresponding to the rate at which the platform is moving in space. This rate will include the velocity at which the platform is moving, i.e., the ship's velocity or the aircraft's velocity and, in addition, the earth's rate. Thus, the term $W_e$ cosλ sinα represents the earth rate resolved as a function of latitude and azimuth angle. The remaining term represents the resolution of the velocity along the Y-axis of the platform divided by the radius of the earth to convert it from a linear to an angular velocity. This input which is the actual input to the Y-gyro 47 will be affected by various errors which are indicated by the dotted line inputs to an imaginary summing junction 71. Similarly an input is provided to the X-gyro 61 which includes an earth's rate term and a term representing the velocity resolved along the X-axis of the platform. Once again this input will be summed with error terms in an imaginary summing junction 73. The input to the Z-gyro comprises a term $W_e$ sinλ representing the earth's rate summed with a term $V_E$ tanλ$_R$ representing the velocity in the same direction as the earth's rotation. Once again an imaginary error is summed in an imaginary summing junction 75. In summary then, FIG. 4 illustrates the two velocity outputs which are developed from the accelerometers, and the three torquing inputs to the inertial platform.

The platform-derived velocities $V_x$ and $V_y$ are provided to the Kalman filter. The Kalman filter also utilizes the North and East reference velocities, called the observations, provided from the carrier reference system. The mechanized Kalman filter equations for the state vector and co-variance matrix update are as follows:

$$\hat{X}_n = \tilde{X}_n + K_n [Y_n - h(\tilde{X}_n)] \quad (1)$$

$$\tilde{X}_n = \hat{X}_{n-1} + \int_{t_{n-1}}^{t_n} f(x) \, dt \quad (2)$$

$$K_n = \tilde{P}_n H_n{}^1 (H_n \tilde{P}_n H_n{}^1 + R_n)^{-1} \quad (3)$$
$$\tilde{P}_n = \phi_{n-1} P_{n-1} \phi_{n-1}{}^1 \quad (4)$$
$$P_n = (1 - K_n H_n) \tilde{P}_n \quad (5)$$

where $\phi$ z f $\phi$ and F and H are the Jacobian of $f(x)$ and $h(x)$, which define the platform dynamics and the observations, respectively:

$\dot{X} = f(x) + u$
$Y_k = h(x_k) + v_k$ where u and v are random noise.

Figure 5:
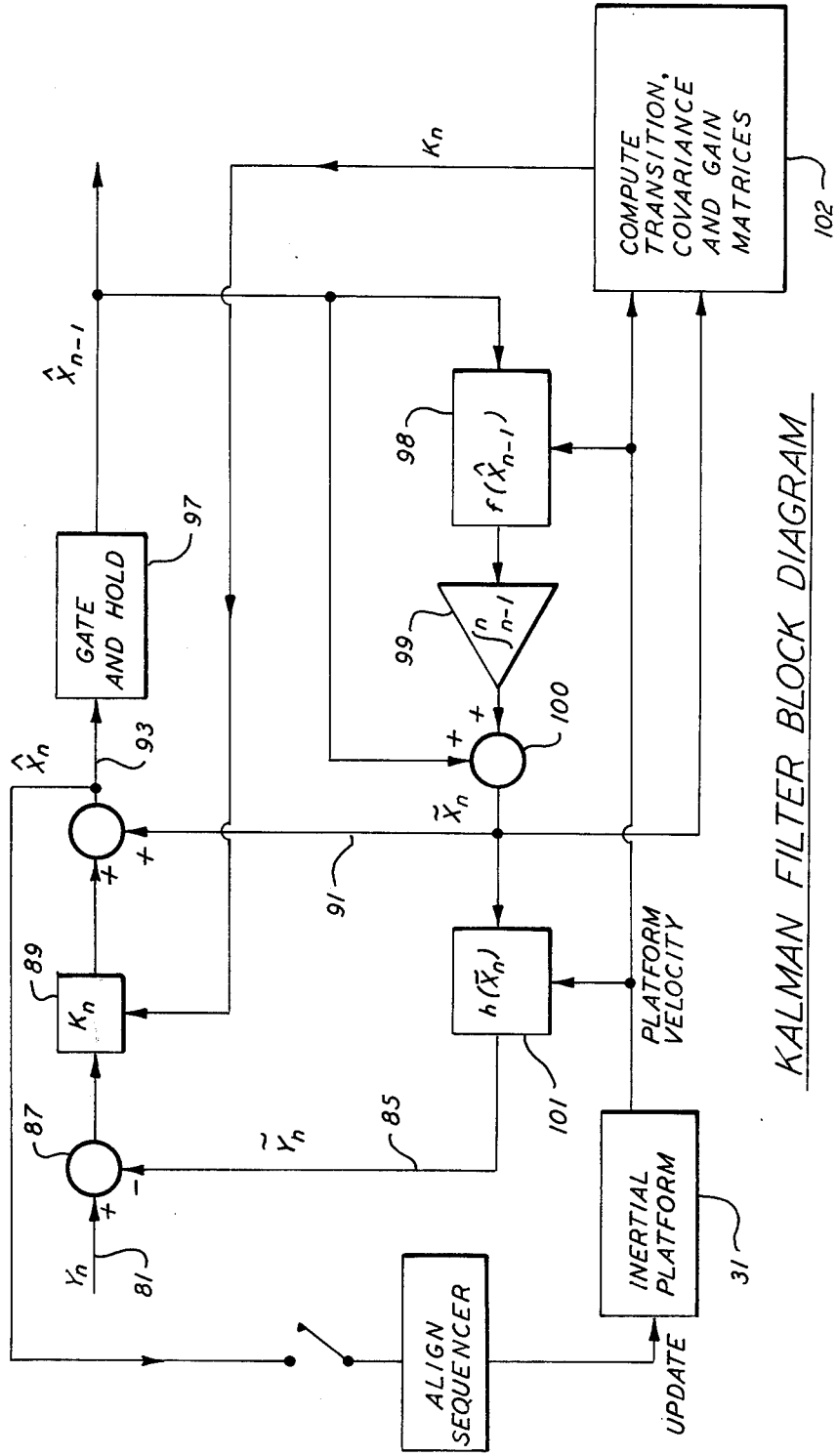
FIG. 5 is a block-flow diagram illustrating the implementation of Kalman equations in the computer modules of the present invention.

A block diagram illustrating the implementation of the Kalman equations in the computer module is shown on FIG. 5. On this Figure, the outputs of the inertial platform 31 are shown again, and update the block 98 every 0.2 seconds. The North and East reference velocities are the measured observation $Y_k$. This measured observation is summed with a predicted observation $Y_k$ input on line 85 in a summing junction 87. The error obtained is provided through a Kalman gain block 89 to obtain a Kalman update, every 10 seconds. This is added to the extrapolated estimate of the state vector, $\tilde{X}_k$, on line 91 to obtain the optimal state vector estimate $\hat{X}_k$ on line 93. This optimal state vector estimate is provided through the alignment sequencer once every 100 seconds, to update the inertial platform (verticality, azimuth, and velocity). It also delayed or stored in block 97 labelled gate hold, and is used to predict the change in X over the 10 seconds intervals between the Kalman updates, via integration (block 99), to provide the output on line 91 to which the new data is added on the next iteration to obtain a new state vector estimate. The extrapolated state vector output from junction 100 is fed through block 101 to provide the output on line 85 which is the predicted observation $Y_k$.

A computer program listing for the implementation of the Kalman filter shown on FIG. 5 including the equations above is attached and will be explained below.

The Kalman filter in the carrier reference system will be implemented in similar fashion. The state vector for this filter will be as follows:

| | |
|---|---|
| Latitude | East platform tilt |
| Longitude | North platform tilt |
| North velocity | Platform azimuth error |
| East velocity | North gyro drift |
| | Azimuth gyro drift |

Typically the carrier reference Kalman update interval will be 20 seconds for EM log inputs and 60 seconds for Omega inputs. The inputs are shown as being provided through an analog to digital converter 21 on FIG. 2. It should be noted, that these inputs can be the phase differences directly, or, since the vehicle is a slowly moving ship, a deterministic conversion from phase difference to latitude and longitude can be done outside the Kalman filter without loss of accuracy from computational delay. That is to say, latitude and longitude inputs can be provided directly as the input to the computer 17 of FIG. 2.

It is possible to mechanize the velocity and position in the Kalman filter state vector either as total quantities or as errors of the inertial subsystem. In the first case the filter is quasi-linear and provides the velocity and position estimate directly. In the second case the filter is linear and provides estimates of velocity and position errors in the inertial subsystem, with the total estimate then formed by adding the Kalman estimate to the inertial velocity and position outputs. In theory either mechanization can be used. However, from a conversion view, the quasi-linear method is preferable if the Kalman observation vector is non-linear function of the state vector. Such would be the case if Omega phase differences are used directly by the filter. For the purposes herein a quasi-linear filter will be assumed.

FIGS. 6a and b and FIGS. 7a and b, respectively, are programs which can be used for implementing the aircraft filter or carrier reference system filter and will now be explained. Referring first to FIG. 6a and b, it will be recognized by those skilled in the art that the first 14 operations are setting up and dimensioning operations to prepare the computer for the program which follows. Beginning with operation 15 initialization takes place. The significant portion of the program begins with step 39 in which the inertial parameters are set up as indicated. Calculations are done to find the tangent of latitude, the latitude rate [PHIDOT], the longitude rate [LAMDOT], the north rate, east rate, and up rate or vertical rate, etc. Once these are computed the F matrix is set up beginning with operation 52. As indicated each term of the matrix is calculated. Thereafter beginning with operation 80 of H matrix is set up. The F matrix is the transition matrix and defines platform dynamics and the H matrix defines the observations as noted above with regard to the equations (1-5). The H matrix is shown specifically for two possibilities, one where north and east velocities are obtained the operations 82–89 are followed and if Loran is the input the operations 93–96 are followed. Upon completion of this program the two matrixes, i.e. the F and H matrixes will be available stored in the computer. These computations are performed possibly at a higher rate than the updating rate and the operation is indicated on FIG. 5 by block 102.

The subroutines shown on FIG. 7a and b is the program which actually carries out the computation of the equations given above for carrying out the necessary updating and estimating. After setting up and initializing much in the manner described above in connection with the other program, an R matrix is set up depending on what mode of operation is being carried out. Note that if neither Loran or some other device is being used, operations 34 and 35 are used. In this case predetermined values previously stored are used in the R matrix and relate to noise when obtaining north and east inputs directly. The significant operation begins at operation 45 when a subroutine FPFT is called. This subroutine performs the multiplication shown by equation (4) above with the F therein representing and P the P in the equation. The result of this multiplication is stored as a matrix D which will correspond to the $\tilde{P}$ of equation (4) above. Note that this quantity is used in computing the gain matrix in equation (3). In operation 46 a matrix addition is performed adding a quantity Z to D to come up with a new matrix G. This is a quantity which sets covariance or rate limits. In the step 48 this matrix is stored as a P matrix. At 51 a subroutine for matrix multiplication is called and the G matrix just computed and the H matrix which was previously stored, i.e. the observation matrix are multiplied to get a new matrix E. In the next step this new matrix E is multiplied by the H matrix transposed. These two together give the first term within brackets of equation (3). At operation 53 a matrix addition subroutine is called and to this new matrix B the R matrix is added. A subroutine to invert this matrix is then called and the quantity in the brackets of the equation 3 now becomes an inverted matrix stored in B. Finally, the matrix is multiplied by the matrix stored in E. Note that the matrix stored in E is in essence the terms $\tilde{P}_n$ and $H^1{}_n$. Thus, the results stored at S is the gain matrix designated $K_n$ in equation (3) above.

Next the covariance matrix given by equation (5) is computed. Note that if that equation is multiplied out there will be two terms. One will be $\tilde{P}_n$ and the other $\tilde{P}_n K_n H_n$. In computing the covariance matrix H and G are multiplied together to obtain a matrix stored in U. Note that G corresponds essentially to the quantity $\tilde{P}_n$ and H, of course to H. The U matrix which is the multiplication of these two matrixes at operation 56 is then multiplied by S, i.e. the gain $K_n$. This gives the second term in equation (5) after multiplication. This answer stored in D is then subtracted from G at operation 58 to give and answer for $P_n$ which is representative of (5).

Next, the operations represented by equation 1, i.e., the update must take place. As noted above, the H matrix is the observation matrix and the F matrix the transition matrix. These two matrixes are multiplied together and the result stored and U. The update of the state vectors then follows. The previous values of state vectors are stored and at operation 60 the X matrix set equal to X previous values. Next, the observation information is obtained. In the case illustrated by FIG. 5 this will be the information indicated at operations 65 and 66, i.e. $V_X$ and $V_Y$. If Loran were being used as in the case of the shipboard filter, the observations would be the observation information new estimates of X are now computed in accordance with equation 1. The U matrix previously computed by multiplying H and F is used to multiply X which, as noted above has sotred therein the previous values. This operation corresponds essentially to the operation at the left hand of the portion of equation 1 in brackets. This results in an 0 matrix. In the next operation 0 is subtracted from Y, the observation thereby giving the answer to the portion of equation 1 in brackets. This results in an 0 matrix. In the operation 0 is subtracted from Y, the observation thereby giving the answer to the portion of equation 1 in brackets. This answer is stored in 0. It is then, at operation 80 multiplied by the gain matrix S and the results stored in Q. This is the multiplication by $K_n$ indicated in equation 1. Next the quantity $X_n$ is multiplied by the transposition matrix F and to obtain a W matrix whereupon the W and Q matrixes are added a operation 82 thus providing the full solution to equation 1 and providing an update of the state vector. The multiplications of X by the F matrix corresponds to an operation equivalent to what is shown by equation (2) above.

Thus, an improved low cost shipboard reference for an aircraft navigation system has been shown. Although specific embodiments have been illustrated and described it will be obvious to those skilled in the art that various modification may be made without departing from the spirit of the invention which is intended to be limited solely by the appended claims.

What is claimed is:

1. A method of rapidly aligning aircraft inertial platforms installed in aircraft located aboard an aircraft carrier which changes its location with time, said aircraft carrier thereby having a state vector containing as elements at least the velocity of said aircraft carrier and its position, comprising the steps of:
   a. installing a low-accuracy aircraft type inertial reference system on the aircraft carrier, said system including an inertial subsystem and a Kalman filter, said inertial subsystem providing as outputs quantities representing the velocity of the aircraft carrier,
   b. installing means on the aircraft carrier providing updating information regarding the state vector of the aircraft carrier to said Kalman filter;
   c. providing as a velocity reference to the aircraft the velocity outputs of the inertial subsystem of said inertial reference system;
   d. updating said inertial subsystem of said inertial reference system from said Kalman filter at intervals of the order of magnitude of two hours and never while providing a velocity reference to an aircraft.

2. The method according to claim 1 wherein said Kalman filter is updated using outputs of an electromagnetic log.

3. The method according to claim 1 wherein said Kalman filter is updated using an electronic position indicating device.

4. The method according to claim 3 wherein said Kalman filter is updated using a Loran set.

5. Apparatus for rapidly aligning an aircraft inertial platform installed in an aircraft which is aboard a moving vehicle, said vehicle thereby having a state vector which includes at least components of velocity and position, comprising:
   a. a low accuracy aircraft type inertial reference system installed on the vehicle, said system including an inertial subsystem and a Kalman filter, said inertial subsystem providing velocity outputs;
   b. means installed on the vehicle coupled as inputs to said Kalman filter of said inertial reference system for providing updating information relating to the state vector of the vehicle;
   c. means for coupling the velocity outputs of said inertial subsystem of said inertial reference system to the aircraft inertial platform of the aircraft to provide a velocity reference thereto; and
   d. means coupling the outputs of said Kalman filter to said inertial subsystem including means for selectively opening and closing the connection therebetween to permit updating at infrequent intervals on the order of magnitude of 2 hours.

6. Apparatus according to claim 5 wherein said means for providing state vector information comprises an electronic log.

7. Apparatus according to claim 5 wherein said means for providing state vector information comprises electronic position indicating means.

8. Apparatus according to claim 7 wherein said position indicating means comprises a Loran set.

9. Apparatus according to claim 5 wherein said Kalman filter comprises a programmed digital computer.

10. Apparatus according to claim 5 wherein said vehicle is an aircraft carrier.

* * * * *